US011609556B2

United States Patent
Lei et al.

(10) Patent No.: US 11,609,556 B2
(45) Date of Patent: Mar. 21, 2023

(54) CONTROL METHOD AND DEVICE BASED ON INDUSTRIAL ETHERNET

(71) Applicant: QKM TECHNOLOGY (DONG GUAN) CO., LTD, Dongguan (CN)

(72) Inventors: Yu Lei, Dongguan (CN); Chunhua Yu, Dongguan (CN); Lihui Chen, Dongguan (CN); Rongkui Zheng, Dongguan (CN); Bin Wang, Dongguan (CN); Jiang Liu, Dongguan (CN)

(73) Assignee: QKM TECHNOLOGY (DONG GUAN) CO., LTD., Dongguan (CN)

( * ) Notice: Subject to any disclaimer, the term of this patent is extended or adjusted under 35 U.S.C. 154(b) by 207 days.

(21) Appl. No.: 17/253,605

(22) PCT Filed: Jul. 8, 2019

(86) PCT No.: PCT/CN2019/095116
§ 371 (c)(1),
(2) Date: Dec. 17, 2020

(87) PCT Pub. No.: WO2020/007372
PCT Pub. Date: Jan. 9, 2020

(65) Prior Publication Data
US 2021/0263503 A1 Aug. 26, 2021

(30) Foreign Application Priority Data

Jul. 6, 2018 (CN) .......................... 201810737048.9

(51) Int. Cl.
G05B 19/418 (2006.01)
H04L 45/02 (2022.01)

(52) U.S. Cl.
CPC ..... G05B 19/4185 (2013.01); G05B 19/4183 (2013.01); G05B 19/41865 (2013.01); H04L 45/02 (2013.01)

(58) Field of Classification Search
CPC ..... H04L 45/02; H04L 41/12; G05B 19/4183; G05B 19/4185; G05B 19/41865
See application file for complete search history.

(56) References Cited

U.S. PATENT DOCUMENTS 6,426,947 B1 * 7/2002 Banker ................. H04L 41/046
370/254
6,952,396 B1 * 10/2005 Cottreau ................. H04L 12/42
455/445

(Continued)

FOREIGN PATENT DOCUMENTS

CN 103404082 A 11/2013
CN 106789258 A 5/2017

(Continued)

Primary Examiner — Thu V Nguyen

(57) ABSTRACT

A control method and device (100) based on an industrial Ethernet relate to the technical field of Ethernet. The industrial Ethernet involves a master node and a plurality of slave nodes. The master node transmits a predetermined packet to a first slave node (S140). The first slave node transmits the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes; and the last slave node transmits the predetermined packet back to the master node (S150). The master node then parses the predetermined packet, which has been rewritten by each of the plurality of the slave nodes, to uncover a topology of the slave nodes (S160). The master node informed by the topology transmits a command packet to one of the plurality of the slave nodes to be controlled (S180). As is shown, the predetermined packet transmitted by the master node is sequentially rewritten by the plurality of the slave nodes so that the master node can be informed of the topology of the (Continued)

slave nodes, thereby realizing distributed control and centralized management and improve security and reliability.

7 Claims, 4 Drawing Sheets

(56) References Cited

U.S. PATENT DOCUMENTS

| | | | | |
|---|---|---|---|---|
| 7,890,663 | B2* | 2/2011 | Millet | H04L 12/433 370/254 |
| 9,021,292 | B2* | 4/2015 | Ross | H03L 7/00 713/502 |
| 10,671,558 | B1* | 6/2020 | Evans | G06F 13/405 |
| 2002/0186667 | A1* | 12/2002 | Mor | H04L 12/427 370/258 |
| 2004/0103179 | A1* | 5/2004 | Damm | H04L 43/50 709/223 |
| 2005/0265358 | A1* | 12/2005 | Mishra | H04L 45/02 370/396 |
| 2007/0204068 | A1* | 8/2007 | Oku | H04L 12/66 709/224 |
| 2010/0131610 | A1* | 5/2010 | Furtner | H04L 12/403 709/208 |
| 2010/0165834 | A1 | 7/2010 | Holness et al. | |
| 2011/0184533 | A1* | 7/2011 | Maruyama | H04L 12/40032 700/3 |
| 2012/0147735 | A1* | 6/2012 | Wang | H04L 12/437 370/217 |
| 2012/0188912 | A1* | 7/2012 | Chen | H04L 45/02 370/258 |
| 2012/0331184 | A1* | 12/2012 | Adar | G06F 13/28 710/22 |
| 2013/0028091 | A1* | 1/2013 | Sun | H04L 43/0876 370/236 |
| 2013/0347103 | A1* | 12/2013 | Veteikis | H04L 43/04 726/22 |
| 2014/0047056 | A1 | 2/2014 | Tahara et al. | |
| 2015/0138949 | A1* | 5/2015 | Kurogi | H04L 41/0668 370/221 |
| 2015/0281055 | A1* | 10/2015 | Lin | H04L 45/748 370/389 |
| 2016/0344653 | A1* | 11/2016 | Kiribuchi | H04L 12/403 |
| 2017/0099213 | A1* | 4/2017 | Bruckner | H04L 12/423 |
| 2017/0373821 | A1* | 12/2017 | Arakawa | H04L 43/087 |
| 2018/0091245 | A1 | 3/2018 | Leyrer et al. | |
| 2021/0263503 | A1* | 8/2021 | Lei | H04L 45/02 |

FOREIGN PATENT DOCUMENTS

| | | |
|---|---|---|
| CN | 107508712 A | 12/2017 |
| JP | 2001320393 A | 11/2001 |
| JP | 2005086437 A | 3/2005 |
| JP | 2009111873 A | 10/2007 |
| JP | 2010074450 A | 4/2010 |
| JP | 2011004149 A | 1/2011 |
| JP | 2012195653 A | 10/2012 |
| JP | 2016181795 A | 10/2016 |
| JP | 2017204263 A | 11/2017 |

* cited by examiner

| Packet event | Node count | Visited node sequence | length of the visited node sequence |
|---|---|---|---|
| A master node transmits a packet | 0 | [] | 0 |
| Arriving at a slave node 1 | 1 | [1] | 1 |
| Arriving at a slave node 2 | 2 | [1,2] | 2 |
| Arriving at a slave node 3 | 3 | [1,2,3] | 3 |
| Arriving at a slave node 2 | 3 | [1,2,3,2] | 4 |
| Arriving at a slave node 1 | 3 | [1,2,3,2,1] | 5 |
| Arriving at a slave node 4 | 4 | [1,2,3,2,1,4] | 6 |
| Arriving at a slave node 5 | 5 | [1,2,3,2,1,4,5] | 7 |
| Arriving at a slave node 4 | 5 | [1,2,3,2,1,4,5,4] | 8 |
| Back to the master node | 5 | [1,2,3,2,1,4,5,4] | 8 |

Fig. 3

CONTROL METHOD AND DEVICE BASED ON INDUSTRIAL ETHERNET

RELATED APPLICATIONS

The application is a national phase application of the International Application PCT/CN2019/095116 filed Jul. 8, 2019, which claims the benefit of the Chinese Patent Application CN201810737048.9 filed Jul. 6, 2018, each of which is incorporated herein by reference in its entirety.

FIELD OF THE INVENTION

The present application relates to the technical field of Ethernet, in particular to a control method and device based on an industrial Ethernet.

BACKGROUND OF THE INVENTION

With the development of industrial automation, an industrial Ethernet sees unceasing development as well, and the size and complexity of the network topology grow along with an increase in the number of automatic equipment. Although a variety of industrial Ethernets are available at present, there exist obvious limitations, such as single function, leading to a failure in identifying the topology of network equipment; single topological connection, leading to a failure in realizing flexible topological connection; and unbalanced controller load manifested by the fact that some CPUs are overloaded while others are under-loaded and resulting in a failure to improve overall performance. In the fields of industrial control and multimedia, many distributed applications require high-precision reconfigurable synchronous control, which is often difficult to achieve in the current industrial Ethernet.

OBJECTS AND SUMMARY OF THE INVENTION

It is one object of the present application to provide a control method based on an industrial Ethernet, so as to automatically identify the topology of network equipment, realize distributed control and centralized management of the industrial Ethernet and improve security and reliability.

The other object of the present application is to provide a control device based on an industrial Ethernet, so as to automatically identify the topology of network equipment, realize distributed control and centralized management of the industrial Ethernet and improve security and reliability.

In a first aspect, an embodiment of the present application provides a method based on an industrial Ethernet for a master node to control a plurality of slave nodes. The method comprises transmitting by the master node to a first slave node in the plurality of the slave nodes a predetermined packet; rewriting the predetermined packet by the first slave node; transmitting the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes; transmitting the predetermined packet by the last slave node back to the master node; parsing the predetermined packet, which has been rewritten by each of the plurality of the slave nodes, by the master node to uncover a topology of the plurality of the slave nodes; and transmitting by the master node, informed by the topology, a command packet to one of the plurality of the slave nodes to be controlled.

Optionally, the method further comprises acquiring a unique ID for each of the plurality of the slave nodes from their configuration files; and categorizing, by function, each of the plurality of the slave nodes into functional groups based on the unique ID.

Optionally, the method further comprises correlating the function of each of the plurality of the slave nodes with the topology.

Optionally, the method further comprises establishing a physical logical mapping table, which corresponds to each of the plurality of the slave nodes, based on the functional groups.

Optionally, the master node, informed by the physical logical mapping table, transmits the command packet to one of the plurality of the slave nodes to be controlled.

Optionally, in the method, each slave node in the plurality of the slave nodes has at least two ports for receiving data from and transmitting data to the master node and another slave node in the plurality of the slave nodes.

The step of transmitting the predetermined packet having been rewritten by a first slave node to a succeeding slave node in the plurality of the slave nodes includes checking whether the succeeding slave node has any linked ports linking another slave node in the plurality of the slave nodes other than an initial port through which the succeeding salve node receives the predetermined packet; if it does not, rewriting and then transmitting by the succeeding slave node the predetermined packet through the initial port; and if it does, checking whether each of the linked ports has transmitted the predetermined packet, if yes, rewriting and then transmitting the predetermined packet through the initial port, and if no, rewriting and then transmitting the predetermined packet through one of the linked ports which have not transmitted the predetermined packet.

Optionally, in the method, each slave node in the plurality of the slave nodes has an ID acquired therefor; and the predetermined packet has a field for node count and a field for a visited node sequence The step of rewriting the predetermined packet by a slave node in the plurality of the slave nodes includes checking whether the field for the visited node sequence has recorded the slave node's ID; if it has not, increasing the node count by 1 and adding the slave node's ID to the visited node sequence; and if it has, not increasing the node count but adding the slave node's ID to the visited node sequence.

Optionally, in the method, the predetermined packet further has a field for length of the visited node sequence; and the step of rewriting the predetermined packet by a slave node in the plurality of the slave nodes further includes increasing the length of the visited node sequence by 1.

Optionally, in the method, the topology describes a relationship that networks the plurality of the slave nodes. the step of parsing the predetermined packet by the master node to uncover a topology includes retrieving by the master node the node count and the visited node sequence from the predetermined packet received from the last slave node; and ascertaining, based on the node count and a sequential order of the IDs in the field for the visited node sequence, a relationship that networks the plurality of the slave nodes each of which is identified by one of the IDs in the sequential order.

Optionally, the method mentioned above further comprises broadcasting by the master node in the industrial Ethernet an acquisition packet; replying to the master node by a slave node which receives the acquisition packet with a response packet, which includes the slave node's unique ID; categorizing the plurality of the slave nodes based on their unique IDs; and ascertaining, based on a slave node's categorization, how a physical control address corresponds to a logical control address for the slave node's I/O port.

In a second aspect, an embodiment of the present application further provides a device based on an industrial Ethernet for a master node to control a plurality of slave nodes. The device comprises a transmitter configured on the master node; a rewriter configured on each of the plurality of the slave nodes; a parser configured on the master node; and a controller configured on the master node, wherein the transmitter transmits from the master node to a first slave node in the plurality of the slave nodes a predetermined packet; the rewriter on the first slave node rewrites the predetermined packet; the first slave node transmits the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes; the last slave node transmits the predetermined packet back to the master node; the parser parses the predetermined packet to uncover a topology of the plurality of the slave nodes; and the controller, informed by the topology, transmits a command packet to one of the plurality of the slave nodes to be controlled.

Optionally, the device further comprises an acquirer configured on the master node; and a categorizer configured on the master node, wherein the acquirer acquires a unique ID for each of the plurality of the slave nodes from their configuration files; and the categorizer categorizes, by function, the plurality of the slave nodes into functional groups based on their unique IDs.

Optionally, the device further comprises a correlator configured on the master node for correlating a function of each of the plurality of the slave nodes with the topology.

Optionally, the device further comprises an establisher configured on the master node, wherein the establisher establishes a physical logical mapping table based on the functional groups; and the physical logical mapping table corresponds to each of the plurality of the slave nodes.

Optionally, in the device, the controller, informed by the physical logical mapping table, is configured to transmit the command packet to one of the plurality of the slave nodes to be controlled.

An embodiment of the present application provides a method and device based on an industrial Ethernet for a master node to control a plurality of slave nodes. The master node transmits a predetermined packet to a first slave node in the plurality of the slave nodes. The first slave node rewrites the predetermined packet and then transmits it to a succeeding slave node linked to the first slave node until a last slave node in the plurality of the slave nodes receives the predetermined packet having been rewritten by all preceding slave nodes in the plurality of the slave nodes. The last slave node transmits the predetermined packet back to the master node. The master node then parses the predetermined packet, which has been rewritten by each of the plurality of the slave nodes, to uncover a topology of the plurality of the slave nodes, and transmits a command packet to one of the plurality of the slave nodes to be controlled. As is shown, the predetermined packet transmitted by the master node is sequentially rewritten by the slave nodes, so that the master node can be informed of the topology in the current industrial Ethernet according to the predetermined packet having been rewritten and accordingly transmit a packet to a specific node of the topology, thereby realizing distributed control and centralized management and improving security and reliability.

In order to clearly illustrate the purposes, features and advantages of the present application, optional embodiments are given hereinafter in detail in conjunction with the accompanying drawings.

BRIEF DESCRIPTION OF FIGURES

Hereinafter is given a brief introduction to the drawings used in the embodiments, in order to clearly illustrate the technical solutions of the embodiments of the present application. It should be understood that the following drawings only show some embodiments of the application, and therefore should not be construed as a limit to the scope. For those of ordinary skill in the art, other related drawings can be obtained from these drawings without creative work.

FIG. 3 shows a schematic diagram of a topology of slave nodes provided by an embodiment of the present application.

Figure 1:
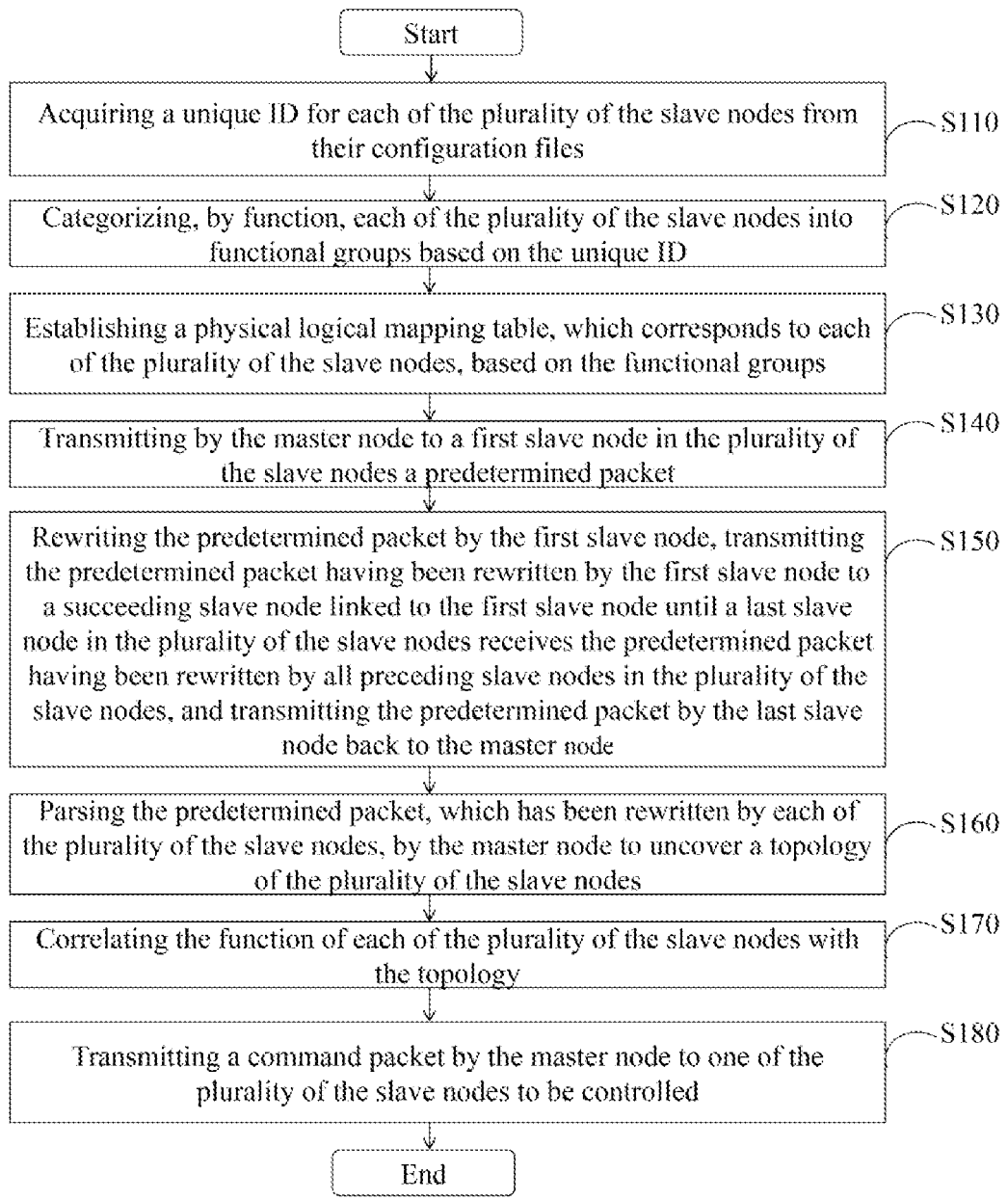
FIG. 1 shows a schematic flowchart of a control method based on an industrial Ethernet provided by an embodiment of the present application.

Reference signs: 100—control device based on an industrial Ethernet; 110—acquirer; 120—categorizer; 130—establisher; 140—transmitter; 150—rewriter; 160—parser; 170—correlator; 180—controller.

DETAILED DESCRIPTION OF THE EMBODIMENTS

The technical solutions in the embodiments of the present application will be clearly and completely described hereinafter in conjunction with the drawings in the embodiments of the present application. It is obvious that the described embodiments are only part rather than all of the embodiments of the application. In general, the components of the embodiments of the application described and shown in the drawings herein may be arranged and designed in various different configurations. Therefore, the detailed description of the embodiments of the application provided in the drawings hereinafter is not intended to limit the scope of the claimed application, but only represents selected embodiments of the application. Based on the embodiments of the present application, the other embodiments obtained by those skilled in the art without creative work all fall within the protection scope of the present application.

It should be noted that similar reference numbers and letters represent similar items in the following drawings. As a result, once an item is defined in a drawing, no further definition or explanation is required in the subsequent drawings. Meanwhile, the terms such as first and second are only used for distinguishing description and should not be interpreted as indicating or implying the relative importance in the description of the present application.

With reference to FIG. 1, which shows a schematic flowchart of a control method based on an industrial Ethernet provided by an embodiment of the present application, the industrial Ethernet involves a master node as a packet transmitter and a plurality of slave nodes as packet receivers.

The slave nodes are linked to each other and can perform a corresponding operation according to the received packet. Hereinafter is given a detailed explanation of each step of the method.

In step S110, the master node acquires a unique ID for each of the plurality of the slave nodes from their configuration files.

In the embodiment, the slave nodes may be, but not limited to, drivers or I/O modules. Each slave node is equipped with a corresponding configuration file where the unique ID of the slave node is recorded. During initialization, the master node scans all network equipment in Ethernet so as to obtain the unique ID in the configuration file of each slave node, through which the function of the slave node can be acquired.

For example, the master node can broadcast an acquisition packet in the industrial Ethernet, and the slave node receiving the acquisition packet can transmit a response packet as reply to the master node, the response packet including the slave node's unique ID. The unique IDs of the slave nodes in the industrial Ethernet can be, but not limited to, a serial number allocated to the slave node, an MAC address of the slave node and a combination of the MAC address and other information.

In step S120, the master node categorizes, by function, the plurality of slave nodes into functional groups based on the unique ID of each slave node.

That is, all the slave nodes are categorized by function into functional groups based on the unique ID of each slave node. The slave nodes having the same attributes are classified as the same level, in other words, all the slave nodes at the same level have the same functions.

In step S130, the master node establishes a physical logical mapping table for each slave node based on the different functional groups of the slave nodes.

Specifically, the physical logical mapping table, a basis for the master node to control the slave nodes, contains a corresponding relationship between the physical serial number and the logical serial number of the slave node. The logical serial number is a point where the master node can control the slave node. The physical serial number is an actual position of the slave node corresponding to the logical serial number. For example, when the slave node is an I/O module, it comprises three I/O channels with the physical serial numbers of A, B and C, respectively. The first two channels A and B are selected from the three channels and mapped to the logical serial numbers 1 and 2, with the logical serial number 1 corresponding to the physical serial number A and the logical serial number 2 corresponding to the physical serial number B. That is to say, the master node only needs to control the logical serial numbers 1 and 2. Since the logical serial numbers 1 and 2 correspond to the physical serial numbers A and B, respectively, the master node actually controls the positions of the slave node corresponding to the physical serial numbers A and B when it controls the logical serial numbers 1 and 2 of the slave node.

In other words, for each slave node, the master node can ascertain, based on a slave node's categorization, how a logical control address corresponds to a physical control address for the slave node's I/O port.

In step S140, the master node transmits a predetermined packet to a first slave node.

Figure 2:
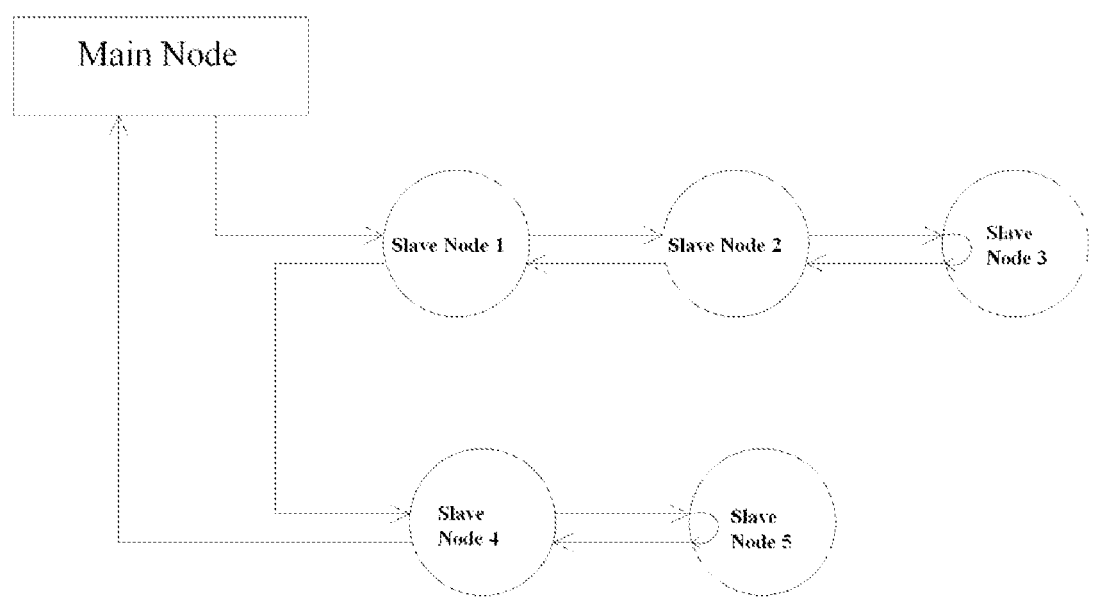
FIG. 2 shows a schematic diagram of a connection relationship between a master node and slave nodes provided by an embodiment of the present application.

Specifically, with reference to FIG. 2 which shows a schematic diagram of a connection relationship between the master node and the slave nodes provided by an embodiment of the present application, a master node and a plurality of slave nodes are connected with each other based on a given rule. However, the connection relationship between the master node and the slave nodes is unknown beforehand. A manual configuration of the connection relationship between them requires a lot of work. As a result, an embodiment of the present application provides a method for automatically identifying the topology of the slave nodes, in order to quickly find the topological structure of an optional slave node network, so that the master node can accurately transmit a packet in a targeted manner according to the acquired slave node topology to control the operation of the slave node. First, the master node transmits a predetermined packet to a first slave node, and the predetermined packet at least comprises three fields, i.e. field for node count, field for visited node sequence, and field for length of the visited node sequence.

In step S150, the predetermined packet having been rewritten by the first slave node is transmitted to a succeeding slave node linked to the first slave node until a last slave node in the plurality of the slave nodes receives the predetermined packet having been rewritten by all preceding slave nodes in the plurality of the slave nodes and transmits it back to the master node.

In the embodiment, each slave node rewrites the received predetermined packet, by whether the field for the visited node sequence has recorded the slave node's ID; if it has not, increasing the node count by 1 and adding the slave node's ID to the visited node sequence; and if it has, not increasing the node count but adding the slave node's ID to the visited node sequence. The slave node's ID can concisely show the identity of the slave node in the Ethernet, such as the serial number of the slave node.

Furthermore, the slave node increases 1 to the length of the visited node sequence no matter whether the field for the visited node sequence has recorded the slave node's ID.

For example, when the predetermined packet reaches a node 1 and the node 1 detects that the field for visited node sequence has not recorded an ID for the node 1, the node 1 modifies the node count from 0 to 1 in the predetermined packet, adds the ID for the node 1, such as [1], into the visited node sequence, and also increases the length of the visited node sequence by 1.

When the predetermined packet is transmitted from the node 1 to a node 2 and the node 2 detects that the field for visited node sequence has not recorded an ID for the node 2, the node 2 modifies the node count from 1 to 2 in the predetermined packet and adds the ID for the node 2 into the visited node sequence, for example, the modified visited node sequence is [1,2], and the node 2 also increases the length of the visited node sequence by 1.

Under some circumstances, the predetermined packet may be transmitted reversely in some paths (which will be explained in detail hereinafter), so as to be received by each slave node. When the slave node receives the reversely-transmitted predetermined packet, it can learn from the field for visited node sequence that the slave node has received and processed such predetermined packet. Therefore, the slave node makes no modification on the node count, but only modifies the field for the visited node sequence.

For example, in the networking scene shown in FIG. 3, when the predetermined packet is transmitted from the node 2 to a node 3 and then back to the node 2, and the node 2 detects that the field for the visited node sequence has not recorded the ID for the node 2, the node 2 makes no modification on the node count, simply adds the ID for the node 2 into the visited node sequence and increases the length of the visited node sequence by 1.

That is to say, when the predetermined packet reaches a node that it has never reached before, the node increases 1 to the node count in the predetermined packet, the transmitting path of the predetermined packet is recorded by the visited node sequence, and the node count is recorded by the length of the visited node sequence.

In the embodiment, each slave node in the plurality of the slave nodes has at least two ports for receiving data from and transmitting data to the master node and another slave node in the plurality of the slave nodes. Multiple slave nodes can form a tree topology, ring topology, etc. by way of cascading.

In the networking scene employing the tree topology, for example, in order to ensure that the predetermined packet can be transmitted to each slave node, the slave node can transmit the predetermined packet by:

checking whether the succeeding slave node has any linked ports linking another slave node in the plurality of the slave nodes other than an initial port through which the succeeding salve node receives the predetermined packet; if it does not, rewriting and then transmitting by the succeeding slave node the predetermined packet through the initial port; and if it does, checking whether each of the linked ports has transmitted the predetermined packet, if yes, rewriting and then transmitting the predetermined packet through the initial port, and if no, rewriting and then transmitting the predetermined packet through one of the linked ports which have not transmitted the predetermined packet.

Based on the transmission logic mentioned above, the predetermined packet can be transmitted to each slave node in a way similar to preorder traversal, and finally, the last slave node rewrites and then transmits the predetermined packet back to the master node.

In step S160, the master node parses the predetermined packet having been rewritten to uncover a topology of the plurality of the slave nodes.

In the embodiment, the topology describes a relationship that networks the plurality of the slave nodes. That is to say, the master node can uncover the topology of the plurality of the slave nodes based on the relationship that networks the plurality of the slave nodes recorded in the predetermined packet.

Specifically, the master node can retrieve the node count and the visited node sequence from the predetermined packet received from the slave nodes, and ascertain, based on the node count and a sequential order of the IDs in the field for the visited node sequence, a relationship that networks the plurality of the slave nodes each of which is identified by one of the IDs in the sequential order.

In step S170, the topology is correlated with the function of each of the plurality of the slave nodes.

That is to say, since the plurality of slave nodes are categorized into functional groups by function, the function of each of the plurality of slave nodes is correlated with the topology one by one, so that the topology can show both the relationship that networks the slave nodes and the function of each slave node. For example, after uncovering the topology, the master node can show a visual topological relationship and the corresponding function of each slave node in the visual topological relationship.

In step S180, the master node informed by the topology transmits a command packet to one of the plurality of slave nodes to be controlled.

Specifically, the master node informed by a physical logical mapping table transmits a command packet to one of the plurality of the slave nodes to be controlled. That is to say, the master node determines the slave nodes to be controlled according to the physical logical mapping table pre-stored in the master node, thereby transmitting the command packet to the slave nodes to be controlled.

As shown hereinabove, an embodiment of the present application provides a control method based on an industrial Ethernet. The topology of all slave nodes in the current industrial Ethernet is automatically identified to thereby realize distributed control and centralized management of the industrial Ethernet, and improve security and reliability.

Figure 4:
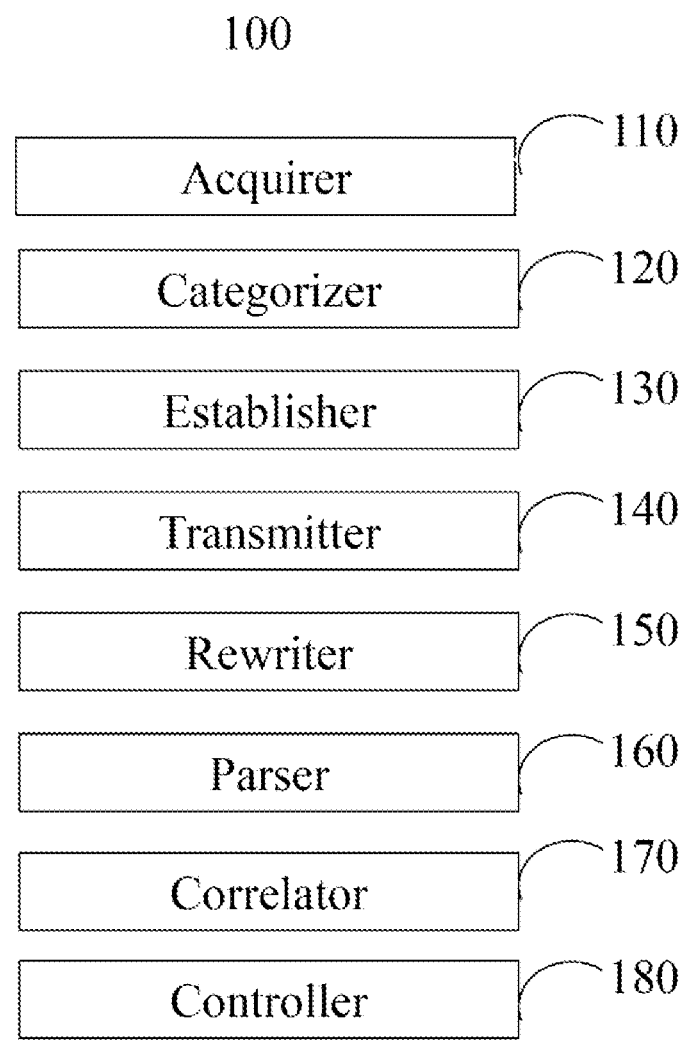
FIG. 4 shows a schematic diagram of functional modules of a control device based on an industrial Ethernet provided by an embodiment of the present application.

With reference to FIG. 4 which shows a schematic diagram of functional modules of a control device 100 based on an industrial Ethernet provided by an embodiment of the present application, the device comprises an acquirer 110, a categorizer 120, an establisher 130, a transmitter 140, rewriters 150, a parser 160, a correlator 170 and a controller 180.

The acquirer 110 is configured on the master node to acquire a unique ID for each of the plurality of the slave nodes from their configuration files.

In the embodiments of the present application, the step S110 can be performed by the acquirer 110.

The categorizer 120 is configured on the master node to categorize, by function, the plurality of the slave nodes into functional groups based on their unique IDs.

In the embodiments of the present application, the step S120 can be performed by the categorizer 120.

The establisher 130 is configured on the master node to establish a physical logical mapping table based on the functional groups.

In the embodiments of the present application, the step S130 can be performed by the establisher 130.

The transmitter 140 is configured on the master node to transmit from the master node to a first slave node in the plurality of the slave nodes a predetermined packet.

In the embodiments of the present application, the step S140 can be performed by the transmitter 140.

The rewriters 150 are configured on each of the plurality of slave nodes to rewrite the predetermined packet in such a way that the first slave node transmits the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes, and the last slave node transmits the predetermined packet back to the master node.

In the embodiments of the present application, the step S150 can be performed by the rewriters 150.

The parser 160 is configured on the master node to parse the predetermined packet to uncover a topology of the plurality of the slave nodes.

In the embodiments of the present application, the step S160 can be performed by the parsing module 160.

The correlator 170 is configured on the master node to correlate a function of each of the plurality of the slave nodes with the topology.

In the embodiments of the present application, the step S170 can be performed by the correlator 170.

The controller 180 is configured on the master node to transmit the command packet to one of the plurality of the slave nodes to be controlled.

In the embodiments of the present application, the step S180 can be performed by the controller 180.

Since a detailed description has been given in the control method based on an industrial Ethernet, no further explanation will be provided herein.

In conclusion, embodiments of the present application provide a method and device based on an industrial Ethernet for a master node to control a plurality of slave nodes. The master node transmits a predetermined packet to a first slave node; the first slave node transmits the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes; the last slave node transmits the predetermined packet back to the master node; and the master node parses the predetermined packet, which has been rewritten by each of the plurality of the slave nodes, to uncover a topology of the plurality of the slave nodes and transmits a command packet to one of the plurality of the slave nodes to be controlled. As is shown, the predetermined packet transmitted by the master node is sequentially rewritten by the plurality of slave nodes so that the master node can be informed of the topology of the slave nodes, and transmit the command packet to a specific slave node, thereby realizing distributed control and centralized management and improve security and reliability.

In the embodiments provided by the present application, it should be understood that the disclosed device and method can also be implemented by other ways. The device embodiments described above are merely illustrative, for example, the flowcharts and block diagrams in the accompanying drawings show the possible architectures, functions and operations of the devices, methods and computer program products according to the multiple embodiments of the present application. In this regard, each block in the flowcharts or block diagrams may represent part of a module, program segment or code, which contains one or more executable commands for implementing a specified logic function. It should be noted that, in some implementations as replacement, the functions shown in the blocks may occur in a sequence different from that in the drawings. For example, two consecutive blocks can be concurrently performed actually, or sometimes performed in a reverse sequence, depending on the functions involved. It should also be noted that each block in the block diagrams and/or flowcharts and a block combination in the block diagrams and/or flowcharts can be implemented by a special hardware-based system performing a specified function or action, or a combination of special hardware and computer instructions.

In addition, all the functional modules in the various embodiments of the present application can be integrated to form an independent part or exist alone, or two or more modules are integrated to form an independent part.

If the functions are implemented in the form of software functional modules and for sale or use as independent products, they can be stored in a computer readable storage medium. Based on this, the technical solutions of the application essentially or part of the application contributing to the prior arts or part of the technical solutions can be embodied in the form of software products. The computer software products are stored in a storage medium and comprise a number of instructions for enabling a piece of computer equipment (such as personal computer, server and network equipment) to execute all or part of the steps of the method in each embodiment of the application. It should be noted that the relation-describing terms such as first and second are only used to distinguish one entity or operation from another entity or operation, and do not necessarily require or imply any such actual relation or sequence among these entities or operations herein. Moreover, the terms such as "comprise", "include" or any other variant thereof are intended to cover non-exclusive inclusion, so that a process, method, object or equipment including a series of elements not only includes those elements, but also includes other elements not listed explicitly, or further includes the inherent elements of the process, method, object or equipment. Under the condition of no further limitations, the element defined by the sentence "include a/an . . . " does not exclude the presence of other identical elements in the process, method, object or equipment including this element.

Hereinabove mentioned are only optional embodiments of the present application, which are not used for limiting the application. For those skilled in the art, various modifications and changes can be made on the application. Within the spirit and principle of the application, any modification, equivalent replacement, improvement, etc. should be included in the protection scope of the application. It should be noted that similar reference numbers and letters represent similar items in the following drawings. As a result, once an item is defined in a drawing, no further definition or explanation is required in the subsequent drawings.

Hereinabove mentioned are only the specific embodiments of the present application, and the protection scope of the present application is not limited thereto. Anyone skilled in the art can easily come up with modifications or replacements within the technical scope disclosed by the present application, and these modifications or replacements should be covered within the protection scope of the present application. Therefore, the protection scope of the present application should be subject to the protection scope of the claims.

INDUSTRIAL APPLICATION

Embodiments of the present application provide a method and device based on an industrial Ethernet for a master node to control a plurality of slave nodes. The master node transmits a predetermined packet to a first slave node; the first slave node transmits the predetermined packet having been rewritten by the first slave node to a succeeding slave node linked to the first slave node until a last slave node in the plurality of the slave nodes receives the predetermined packet having been rewritten by all preceding slave nodes in the plurality of the slave nodes; the last slave node transmits the predetermined packet back to the master node; and the master node parses the predetermined packet, which has been rewritten by each of the plurality of the slave nodes, to uncover a topology of the plurality of the slave nodes and transmits a command packet to one of the plurality of the slave nodes to be controlled. As is shown, the predetermined packet transmitted by the master node is sequentially rewritten by the plurality of the slave nodes so that the master node can be informed of the topology of the slave nodes, and transmit the command packet to a specific slave node, thereby realizing distributed control and centralized management and improve security and reliability.

What is claimed is:
1. A method based on an industrial Ethernet for a master node to control a plurality of slave nodes, comprising the steps of:
 transmitting by the master node to a first slave node in the plurality of slave nodes a predetermined packet;
 rewriting the predetermined packet by the first slave node;
 transmitting the predetermined packet having been rewritten by the first slave node to a succeeding slave node linked to the first slave node until a last slave node in the plurality of slave nodes receives the predetermined packet having been rewritten by all preceding slave nodes in the plurality of slave nodes;

transmitting the predetermined packet by the last slave node back to the master node;
parsing the predetermined packet, which has been rewritten by each of the plurality of slave nodes, by the master node to uncover a topology of the plurality of slave nodes;
acquiring a unique ID for each of the plurality of slave nodes from their configuration files;
categorizing, by function, each of the plurality of slave nodes into functional groups based on the unique ID;
establishing a physical logical mapping table, which corresponds to each of the plurality of slave nodes, based on the functional groups; and
the master node, informed by the physical logical mapping table and the topology, transmits a command packet to one of the plurality of slave nodes to be controlled, wherein:
the step of transmitting the predetermined packet having been rewritten by a first slave node to a succeeding slave node in the plurality of slave nodes includes:
checking whether the succeeding slave node has any linked ports linking another slave node in the plurality of slave nodes other than an initial port through which the succeeding salve node receives the predetermined packet:
if it does not, rewriting and then transmitting by the succeeding slave node the predetermined packet through the initial port; but
if it does, checking whether each of the linked ports has transmitted the predetermined packet:
if it has, rewriting and then transmitting the predetermined packet through the initial port; but
if it has not, rewriting and then transmitting the predetermined packet through one of the linked ports which have not transmitted the predetermined packet.

2. The method in claim 1, wherein:
each slave node in the plurality of slave nodes has a unique ID acquired therefor;
the predetermined packet has a field for node count and a field for a visited node sequence; and
the step of rewriting the predetermined packet by a slave node in the plurality of slave nodes includes:
checking whether the field for the visited node sequence has recorded the slave node's unique ID;
if it has not, increasing the node count by 1 and adding the slave node's unique ID to the visited node sequence; and
if it has, not increasing the node count but adding the slave node's unique ID to the visited node sequence.

3. The method in claim 2, wherein:
the predetermined packet further has a field for length of the visited node sequence; and
the step of rewriting the predetermined packet by a slave node in the plurality of slave nodes further includes:
increasing the length of the visited node sequence by 1.

4. The method in claim 2, wherein:
the topology describes a relationship that networks the plurality of slave nodes; and
the step of parsing the predetermined packet by the master node to uncover a topology includes:
retrieving by the master node the node count and the visited node sequence from the predetermined packet received from the last slave node; and
ascertaining, based on the node count and a sequential order of the unique IDs in the field for the visited node sequence, a relationship that networks the plurality of slave nodes each of which is identified by one of the unique IDs in the sequential order.

5. The method in claim 1, further comprising:
broadcasting by the master node in the industrial Ethernet an acquisition packet;
replying to the master node by a slave node which receives the acquisition packet with a response packet, which includes the slave node's unique ID;
categorizing the plurality of slave nodes into functional groups based on their unique IDs; and
ascertaining, based on the functional groups, how a physical control address corresponds to a logical control address for the slave node's I/O port.

6. A device based on an industrial Ethernet for a master node to control a plurality of slave nodes, comprising:
a transmitter configured on the master node;
a rewriter configured on each of the plurality of slave nodes;
a parser configured on the master node;
a controller configured on the master node;
an establisher configured on the master node;
an acquirer configured on the master node; and
a categorizer configured on the master node, wherein:
the transmitter transmits from the master node to a first slave node in the plurality of slave nodes a predetermined packet;
the rewriter on the first slave node rewrites the predetermined packet;
the first slave node transmits the predetermined packet having been rewritten by the first slave node to a succeeding slave node linked to the first slave node until a last slave node in the plurality of slave nodes receives the predetermined packet having been rewritten by all preceding slave nodes in the plurality of slave nodes;
the succeeding slave node is checked whether it has any linked ports linking another slave node in the plurality of slave nodes other than an initial port through which the succeeding salve node receives the predetermined packet:
if it does not, the succeeding slave node rewrites and then transmits the predetermined packet through the initial port; but
if it does, each of the linked ports is checked whether it has transmitted the predetermined packet:
if it has, the predetermined packet is rewritten and then transmitted through the initial port; but
if it has not, the predetermined packet is rewritten and then transmitted through one of the linked ports which have not transmitted the predetermined packet;
the last slave node transmits the predetermined packet back to the master node;
the parser parses the predetermined packet to uncover a topology of the plurality of slave nodes;
the acquirer acquires a unique ID for each of the plurality of slave nodes from their configuration files;
the categorizer categorizes, by function, the plurality of slave nodes into functional groups based on their unique IDs;
the establisher establishes a physical logical mapping table based on the functional groups;
the physical logical mapping table corresponds to each of the plurality of slave nodes; and the controller, informed by the physical logical mapping table and the topology, transmits a command packet to one of the plurality of slave nodes to be controlled.

7. The device in claim 6, wherein a correlator is further configured on the master node for correlating a function of each of the plurality of slave nodes with the topology.

\* \* \* \* \*